United States Patent
Foucar

[15] 3,643,451
[45] Feb. 22, 1972

[54] METHOD FOR THE PRODUCTION OF HIGH-PURITY, HIGH-PRESSURE CARBON DIOXIDE FROM A MIXTURE OF LOW-PRESSURE MIXED ACIDIC GAS

[72] Inventor: Harry G. Foucar, Shaler Township, Allegheny County, Pa.

[73] Assignee: United States Steel Corporation

[22] Filed: Aug. 18, 1969

[21] Appl. No.: 850,852

[52] U.S. Cl..........................................62/28, 62/18, 62/40
[51] Int. Cl..........................................F25j 3/02
[58] Field of Search..................62/18, 23, 24, 27, 28, 40; 23/181, 206, 134; 55/73, 75

[56] References Cited

UNITED STATES PATENTS

| 3,078,640 | 2/1963 | Milton | 55/75 |
| 3,186,789 | 6/1965 | Ward | 23/181 |
| 3,417,572 | 12/1968 | Pryor | 62/40 |
| 3,292,382 | 12/1966 | Bray | 62/25 |

OTHER PUBLICATIONS

Al Kohl, Selective H S Absorption in Petroleum Processing Vol. 6, No. 1 Jan. 1951 pp. 26–31.

*Primary Examiner*—Norman Yudkoff
*Assistant Examiner*—A. F. Purcell
*Attorney*—Robert J. Leek, Jr.

[57] ABSTRACT

A process is disclosed for producing high-purity, high-pressure carbon dioxide from a concentrated low-pressure mixture of acid gases including one or more sulfur-containing gaseous compounds, and carbon dioxide as the major gas in the mixture with the highest vapor pressure, the mixture containing less than 1 percent of nonacid gases. The process including the steps of: compressing the mixture of acid gases, cooling the mixture of acid gases to liquefy the mixture of acid gases, fractionating the mixture of liquefied acid gases into a high-purity carbon dioxide liquid overhead of about 99.95 percent and a liquid bottom of condensed sulfur compounds, and vaporizing the carbon dioxide liquid overhead in heat exchange relationship with the mixture of acid gases during the cooling thereof.

13 Claims, 1 Drawing Figure

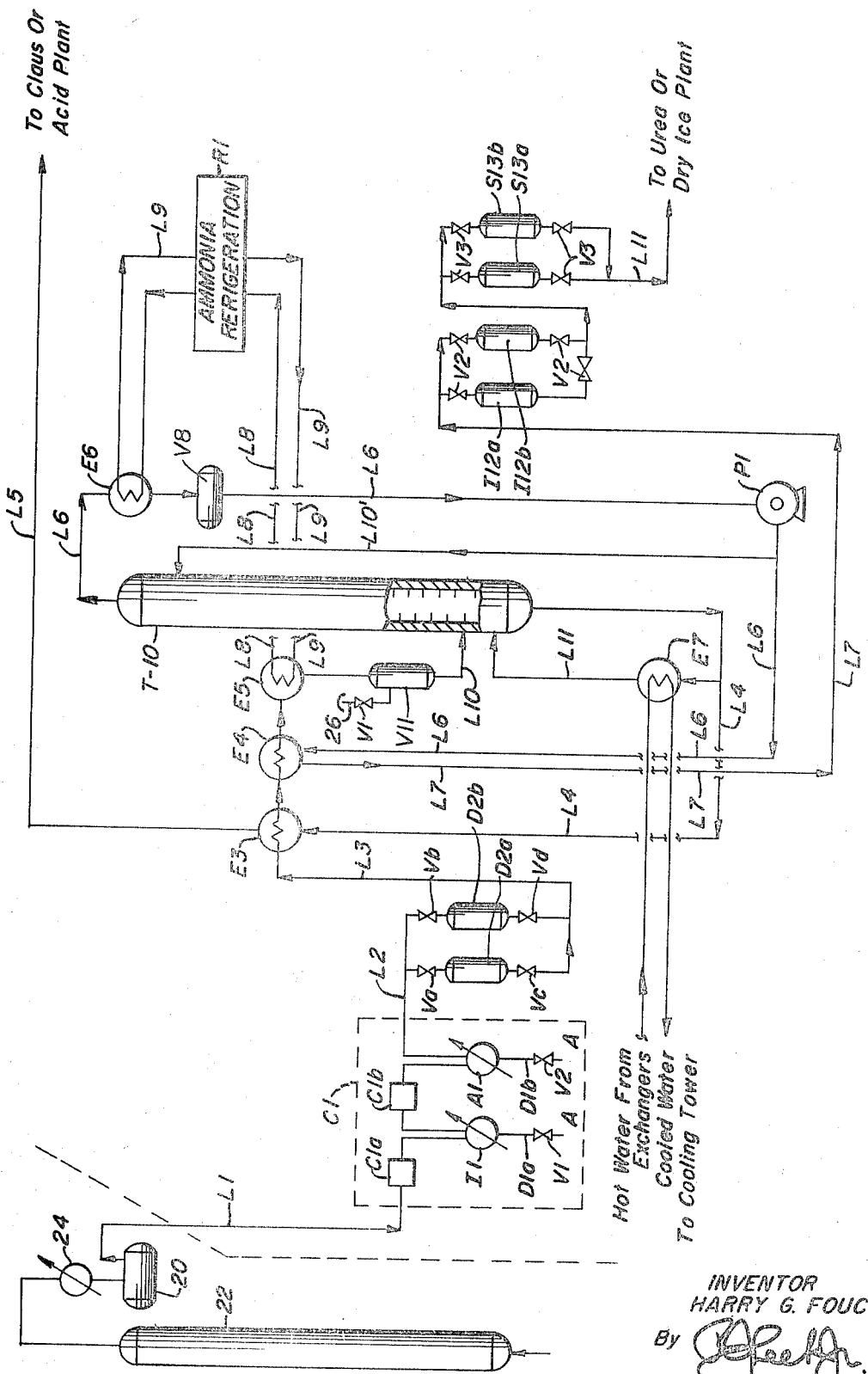

METHOD FOR THE PRODUCTION OF HIGH-PURITY, HIGH-PRESSURE CARBON DIOXIDE FROM A MIXTURE OF LOW-PRESSURE MIXED ACIDIC GAS

BACKGROUND OF THE INVENTION

Heretofore, high-purity carbon dioxide has not been produced commercially and economically from a concentrated mixture of acid gases. Such acid gases commonly include hydrogen sulfide, carbon dioxide, carbon disulfide, carbonyl sulfide, mercaptans, thiophenes, and hydrogen cyanide.

In those cases where the only acidic gases included in the feed stock are carbon dioxide and hydrogen sulfide, the invention makes it possible to economically produce both high purity carbon dioxide and high-purity hydrogen sulfide. However, in the general case where a feed stock from a process utilizing coal or petroleum contains three or more acidic gases including carbon dioxide, the invention makes it possible to economically recover high-purity carbon dioxide gas at high pressure, and a mixture of concentrated gasefied sulfur compounds that may be advantageously used for the production of elemental sulfur or sulfuric acid.

The longstanding need for high-purity high-pressure carbon dioxide is directly connected with economics. There are a number of potential sources of pure carbon dioxide, but very few are sources from which high-purity carbon dioxide can economically be prepared. Common sources are:
1. The products of combustion of all carbonaceous fuels;
2. The byproduct of fermentation;
3. Flue gas from calcining limestone;
4. The water gas shift reaction;
5. The action of acid on dolomite;
6. The byproduct of sodium phosphate;
7. Natural carbon dioxide wells;
8. Animal metabolism; and
9. The products from coking of coal or cracking of oil.

The chief present sources for the economic production of carbon dioxide have been the "water-gas shift reaction" and the byproduct gas from fermentation. In both cases there are essentially no sulfur gases present in the original feed stock.

Coal processors, such as steel companies, and oil processors having refineries, utilize coal or oil to produce large amounts of hydrogen, and of carbon dioxide as well as other acidic gases. Such processors normally contemplate the production of ammonia from cryogenic nitrogen, and from the large amounts of hydrogen normally produced from coal and oil. Subsequently, they may have the problem of obtaining pure carbon dioxide from their available acid gases to combine with ammonia in order to enter the fast-growing urea manufacturing field. Alternately they may wish to use the carbon dioxide with hydrogen to make methanol and formaldehyde.

Urea is required at the rate of about 1,500,000 tons per year in the United States, and the total world consumption is about 3,500,000 tons. Each ton of urea requires about 0.8 ton of carbon dioxide. The value of urea is presently about $80 per ton, but pure carbon dioxide has no published value because normally it is not shipped in large quantities to a variety of customers as a chemical feed stock.

There has been a great deal of investigation on the removal of hydrogen sulfide and other sulfur compounds from gas streams, because such compounds are odoriferous or even poisonous, and are often deleterious to the common metals. There has been very little work done for the purpose of removing only carbon dioxide from gas streams containing a mixture of acidics because carbon dioxide is not generally serious physiologically, it is not odoriferous, and it is not deleterious to metals when dry. Nevertheless the removal of carbon dioxide from gas streams has been closely allied to the removal of hydrogen sulfide because in the majority of large commercial processes they are removed together, due to their similar acidic natures or due to the physical sizes of the molecules. Because the removal of carbon dioxide in a mixed acid gas is often a matter of indifference, except as an expense, there has been a tendency to accept the additional expense of removing carbon dioxide with sulfur gases rather than pay a still greater amount in order to remove only the sulfur gases through special techniques.

It is obvious that when a process stream contains carbon dioxide, but no hydrogen sulfide or other acid gases, any one of many conventional adsorption systems can produce high-purity carbon dioxide. On the other hand the present invention is applicable to high-purity carbon dioxide production for the many instances where hydrogen sulfide is also present, and where both gases have been removed simultaneously by a conventional acid gas removal system.

The conventional acid gas removal systems, which will simultaneously remove most acid gases, including hydrogen sulfide and carbon dioxide, include the following:
1. Physical absorption systems, such as either the Rectisol system offered by Lurgi Gesellschaft fur Warmetechnik, or the system which depends on differences in solubility of the gases in water at high pressure and at low pressure.
2. Chemical absorption systems including Amine systems, Ammonia systems, and Alkali salt systems such as the Carbonate system, Seaboard system, Vacuum carbonate system, Tripotassium phosphate system, Sodium phosphate system, Alkacid system, Hot potassium carbonate system, and the Giammarco-Ventrocoke system; or
3. Molecular sieve system such as the Linde Molecular Sieves manufactured by Union Carbide Corporation, Moorestown, New Jersey.

These above-mentioned systems are discussed in "Gas Purification" by Kohl and Riesenfeld (McGraw-Hill).

The systems that are designed to remove hydrogen sulfide only in the presence of carbon dioxide are:
1. Dry oxidation system including Iron oxide process, Soda-iron process, Appelby Frodingham process, Activated carbon process, Katasulf process or the North Thames Gas Board process;
2. Wet oxidation system including the Burkheiser process, Ferrox process, Gluud process, Manchester process, Thylox process, Fischer process, Staatsmijner process, Perox process, or the Permanganate process;
3. Catalytic systems to convert organic sulfur to hydrogen sulfide including the Carpenter-Chavee process, Peoples Gas process, Holmes-Maxted process; or the British Gas Research process.
4. Molecular sieve systems such as the above-mentioned Linde Molecular Sieves.

These above-mentioned systems are discussed in "Gas Purification" by Kohl and Riesenfeld.

To date, there appears to be no existing system to economically recover carbon dioxide, in high purity, and at high pressure, in the presence of hydrogen sulfide.

It should be noted that the various conventional methods for removing hydrogen sulfide and other sulfur compounds, could conceivably be followed by one of the above systems for removing either carbon dioxide or hydrogen sulfide. However, carbon dioxide produced by this maneuver will be at low pressure, and will cost about $20 per ton. As such, it is uneconomical.

OBJECTS OF THE INVENTION

It is the general object of this invention to avoid and overcome the foregoing and other difficulties of and objections to prior art practices by the provision of a method for producing high-purity, high-pressure carbon dioxide from a mixture of low-pressure acidic gas, which method and apparatus:
1. produce a low-cost, high-purity, high-pressure carbon dioxide suitable for the production of urea, at a pressure of about 300 p.s.i.a. instead of the conventional 15 to 50 p.s.i.a., thereby reducing the cost of an urea plant utilizing such carbon dioxide;
2. produce high-purity, high-pressure carbon dioxide suitable for combination with hydrogen to form methanol;

3. as a byproduct of the production of pure carbon dioxide, concentrate the sulfur gases, which can then be used economically in a process for the production of solid sulfur or sulfuric acid.

BRIEF SUMMARY OF THE INVENTION

The aforesaid objects of this invention, and other objects which will become apparent as the description proceeds, are achieved by providing a process of and apparatus for producing high-purity, high-pressure carbon dioxide from a concentrated low-pressure mixture of acid gases including one or more sulfur-containing gases, and carbon dioxide as the gas in the mixture with the highest vapor pressure, the mixture containing less than 1 percent of nonacid gases. The process includes the steps of compressing the mixture of acid gases, cooling the mixture of acid gases to liquefy the mixture of acid gases, fractionating the mixture of liquefied acid gases into a high-purity carbon dioxide liquid overhead of about 99.95 percent and a sulfur containing gas liquid bottoms, and vaporizing the carbon dioxide liquid overhead in heat exchange relationship with the mixture of acid gases during the cooling thereof.

BRIEF DESCRIPTION OF THE DRAWING

For a better understanding of this invention reference should be had to the accompanying drawing, wherein like numerals of reference indicate similar parts throughout and wherein the sole FIGURE is a diagrammatic view of the improved apparatus of the present invention for producing high-purity, high-pressure carbon dioxide.

Although the principles of this invention are broadly applicable to the production of high-purity, high-pressure gas from an acid gas mixture, this invention is particularly adapted for use in conjunction with the production of high-purity, high-pressure carbon dioxide from acid gas mixtures and hence it has been so illustrated and will be so described.

DETAILED DESCRIPTION

With specific reference to the form of this invention illustrated in the drawing, a reflux drum 20 is shown for removing acid gases from a gas stream which has been processed through a stripper 22 and a condenser 24 of such system. The mixture of acid gases is one in which carbon dioxide has the highest vapor pressure, which contains less than 1.0 percent of nonacid gases, and which contains gaseous sulfur compounds.

Typical conditions and analysis of the mixture of acid gases from an acid gas removal system would be as follows:

|  | Usual | Optimum |
|---|---|---|
| Temperature | 40° to 150° F. | 40° F. |
| Pressure | 15 to 50 p.s.i.a. | 50 p.s.i.a. |
| Composition |  |  |
| $H_2S$ | 5 to 60% (mol) | 5% (mol) |
| $CO_2$ | 40 to 95% | 95% |
| COS | <5 | none |
| $CS_2$ | <2 | none |
| $SO_2$ | <2 | none |
| Mercaptan | <2 | none |
| Thiophenes | <2 | none |
| HCN | <2 | none |
| Water | <20 | none |

The above gas mixture is fed via line L1 to a two-stage compressor C1 having an intercooler I1, aftercooler A1 and gas compressor cylinders C1a, C1b formed of corrosive resistant metal. The discharge of the aftercooler A1 is in the pressure range of about 300 to 500 p.s.i.a. and a temperature range of about 40 to 200° F. but the economically preferred discharge ranges should be 325 to 350 p.s.i.a. and about 40 to 110° F. It is advantageous to remove and discard the intercooler and aftercooler condensate together with oils and dissolved gases through valves, V1, V2 in discharge lines D1a, D1b.

From the compressor after cooler A1, the gas is usually charged by line L2 through valve Va or Vb to either of dryers D2A or D2B, which dryers D2A, D2B have beds of an adsorbent, such as silica gel or alumina, to remove the water to a dew point of at least about −60° F. The dryers D2A, D2B are of the alternating fixed bed type, and are used to prevent the formation of hydrates in the sequential equipment.

From the dryer D2A or D2B the compressed dried mixture of acid gases at a pressure of about 320 to 345 p.s.i.a. and at a temperature of about 40° to 110° F., is discharged through valves Vc or Vd to line L3 and a series of three exchangers E3, E4, E5 which have the combined duty of liquefying and chilling the mixture of acid gases.

Exchanger E3 is a "bottoms vaporizer" of the shell and tube type in which the mixture of acid gases is refrigerated by the liquid bottoms carried thereto by line L4 from a fractionation tower T10, which liquid bottoms enter the exchanger E3 at about 300 to 325 p.s.i.a. and at about 50° to 90° F. and leave via line L5 at about 50 p.s.i.a. as a feed gas for a Claus plant or an acid plant. In exchanger E3 the mixture of acid gases is cooled to a temperature of about 50° F. at a pressure of about 315 to 340 p.s.i.a., and a small proportion of the gas may be liquefied.

Exchanger E4 is a carbon dioxide vaporizer of the shell and tube type in which the mixture of acid gases is further refrigerated by the carbon dioxide liquid overhead pumped by pump P1 from the heat exchanger E6 via line L6. The carbon dioxide liquid overhead enters exchanger E4 at about 350 to 375 p.s.i.a. and at about 0° F., and leaves through line L7 as a gas at about 340 to 365 p.s.i.a., and at about 40° F. In exchanger E4 part of the mixture of acid gases to the fractionating tower T10 are condensed. The acid compounds in a mixed liquid and gas form leave the exchanger E4 at a temperature of about 40° F. and at a pressure of about 310 to 335 p.s.i.a.

Exchanger E5 is a feed chiller of the shell and tube type in which the condensation of the mixture of acid gases being fed to fractionating tower T10 is essentially completed and a small amount of subcooling is accomplished. The temperature of the feed of the mixture of acid gases to the fractionating tower T10 via line L10 will be about 35° to 40° F. and the pressure will be about 305 to 330 p.s.i.a. The refrigerant in the exchanger E5 is preferably ammonia, which enters the exchanger E5 as a liquid at about 18 to 40 p.s.i.a. and at a temperature of about −21° to +11° F. and leaves the exchanger E5 as a vapor. As shown in FIG. 1, the ammonia refrigeration system has a heat exchanger E6 of the shell and tube type in heat exchange relationship with line L6 (carrying the carbon dioxide liquid overhead from fractionating tower T10) and is connected by lines L8, L9 through the refrigerator unit R1 to the exchanger E5. The refrigerating effect for exchanger E6 is provided by ammonia evaporated at about 18 p.s.i.a. and at about −21° F.

From exchanger E5 the liquid mixture of acid gases is collected via line L10 in a drum V11, the top of which is vented at 26 through a valve V1 to remove undesirable noncondensables such as methane, ethane, nitrogen and the like.

The separation of high-purity carbon dioxide from the mixture of acid gases is carried out in fractionating tower T10 which operates at about 300 to 350 p.s.i.a. and at temperature ranges of about −5° to −10° F. at the top and at about 40° to 70° F. at the bottom. The fractionating tower T10 contains 60 to 100 fractionation plates and has an external reflux ratio of about 5:1.

The heat for the separation of the carbon dioxide is provided by a reboiler E7 of the shell and tube type. The heating medium is most advantageously the water discharge (at about 90° to 150° F.) from water-cooled exchangers (not shown), either in the facilities of the invention, i.e., from the water cooled condensers for the ammonia vapor involved in the refrigeration system, or in other nearby facilities. This water is cooled in reboiler E7, as it furnishes heat to the tower T10, before being discharged to the inlet sump (not shown) of the cooling water tower (not shown) which supplies the water. Such heating medium is in heat exchange relationship in the reboiler E7 with a portion of the sulfur bearing liquid compounds from the bottom of the fractionating tower T10 through line L4 and branch line L11, which branch line L11 flows through the reboiler E7 and into the bottom of the fractionating tower T10 for the purpose of carrying heat to the mixture of acid liquids as part of the process for causing the separation of the carbon dioxide therefrom.

The carbon dioxide liquid overhead of fractionation tower T10 is 99.95 percent carbon dioxide gas at about $-5°$ to $+5°$ F. at a pressure of about 300 p.s.i.a. This carbon dioxide gas is condensed and subcooled to about $-5°$ F. in the overhead condenser or exchanger E6 from which it discharges to reflux drum V8.

Reflux pump P1 raises the pressure of the carbon dioxide liquid overhead in line L6 to approximately 50 p.s.i. over the pressure at the top of the fractionating tower T10, and part of the liquid overhead is used to reflux the fractionating tower T10 through branch line L10' from line L6. The remainder is used as a refrigerant in the exchanger E4 as previously noted.

After passing through exchanger E4 the 99.95 percent pure carbon dioxide gas at about 340 to 365 p.s.i.a. and at about 40° F. passes through line L7 to one of two iron oxide boxes I12A or I12B as controlled by valves V2, wherein the carbon dioxide purity is raised to about 99.99 percent by removal of most of the remaining sulfur containing gas (i.e., hydrogen sulfide). These iron oxide boxes I12A, I12B utilize wood shavings impregnated with a hydrated form of iron oxide in the form of iron sponges so that the hydrogen sulfide reacts with the iron oxide to form ferric sulfide. From the iron oxide boxes I12A, I12B the carbon dioxide gas at about 330 to 355 p.s.i.a. and about 40° F. passes to one of two molecular sieve systems, S13A, S13B as controlled by valves V3 where essentially all the remaining hydrogen sulfide, together with water vapor formed in the iron oxide system I12A, I12B is removed. The sieves are manufactured by Union Carbide Corporation, Moorestown, New Jersey, as Linde Molecular Sieves.

The gas flowing through line L11 is very high-purity (i.e., about 99.99+ percent) carbon dioxide gas at about 320 to 350 p.s.i.a. and at about 50° to 60° F. This gas is an excellent feed stock for the manufacture of either urea or methanol, or dry ice.

EXAMPLE

As an example of the present invention, a feed mixture of 300 tons per day of a gaseous mixture of carbon dioxide (85 mole percent) and hydrogen sulfide (15 mole percent) is available as feed stock at about 18 p.s.i.a. and about 110° F. from the top of the stripper (not shown) of an amine-type acid gas removal system of the type known as the Girbotol process, which was offered at one time by the Girdler Corporation, later part of C&I-Girdler Corporation.

OPERATION

To obtain high-purity, high-pressure carbon dioxide from the example mixture, the above mixture of acid gases is compressed at C1a, C1b to about 350 p.s.i.a., dried at D2A, D2B and liquefied in exchanger E3 using the evaporation of the liquid hydrogen sulfide bottoms from tower T10 through line L4, in exchanger E4 using the evaporation of the liquid carbon dioxide overhead from tower T10 through line L6, and in interchanger E5 using the refrigerating effect of liquid ammonia from the refrigeration unit R1 through lines L8, L9.

The liquefied mixture of acid gases is fractionated at about 300 p.s.i.a. in the tower T10 which has about 53 theoretical plates or about 100 real plates. The external reflux ratio in the tower T10 through line 40 is about 5:1 which is about 2.3 times the minimum reflux ratio. The temperature at the top of the tower T10 is about 0° F. and the temperature at the bottom of the tower is about 56° F. The reflux pump P1 discharges at about 375 p.s.i.a. The diameter of the tower T10 is about 4 feet 6 inches and the tower height is about 160 feet. The impurities in the carbon dioxide gas leaving the top of the tower T10 in line L6 are about 0.05 percent and the pressure of the product after it has been vaporized in exchanger E4 to refrigerate the tower feed of the mixture of acid gases is about 360 p.s.i.a. The liquid bottoms of the tower T10 in line L4 is about 37 tons per day of about 97 percent hydrogen sulfide and 3 percent carbon dioxide, which mixture is vaporized in exchanger E3 at about 50 p.s.i.a. and sent as a gas in line L5 to a Claus plant or a sulfuric acid plant.

The ammonia refrigeration load on the tower condenser E6 is about 1,335 tons, but the load on the feed chiller E5 to completely liquefy the feed mixture of acid gases for the tower T10 is only about 18 tons. The heat for the reboiler E7 is obtained by using about 1,275 g.p.m. of about 100° F. discharge water from various exchangers (not shown), and cooling the water to about 75° F.

The vaporized carbon dioxide from the dioxide evaporator exchanger E4 is then passed through a high-pressure iron oxide box (either I12A or I12B) and thereafter through a high-pressure molecular sieve (either S13A or S13B). The final product in line L11 is about 260 tons per day of gaseous carbon dioxide at a pressure of about 315 p.s.i.a. and with a hydrogen sulfide content of less than 10 p.p.m. Such carbon dioxide is discharged to compressors (not shown) in a urea plant (not shown).

ALTERNATIVE EMBODIMENTS

It will be understood by those skilled in the art that alternatively the two-stage compressor C1 may be equated by a multistage centrifugal blower (not shown), and the coolers, I1, A1 for the compressor C1 may be equated by a different number of exchangers (not shown) with roughly the same total heat duty. The refrigeration for feed chiller exchangers E5 and E6 is furnished by vaporized ammonia, but other refrigerants (such as Freon, the trade name of a liquid manufactured by E. I. duPont de Nemours) could be used. The heat for the reboiler E7 is furnished by hot water, but another heating medium, such as steam, can be used, although at an economic disadvantage. The use of iron oxide system I12A, I12B and the molecular sieve system S13A, S13B is optional. The tower T10 itself will produce 99.95 percent purity carbon dioxide, the tower T10 and the iron oxide system I12A, I12B will produce about 99.99 percent purity, while the tower T10 and the iron oxide boxes I12A, I12B and the molecular sieves S13A, S13B will produce about 99.99+ percent purity. The use of the drying system D2A, D2B is desirable but not necessary in every case.

SUMMARY OF THE ACHIEVEMENT OF THE OBJECTS OF THE INVENTION

It will be recognized by those skilled in the art that the objects of this invention have been achieved by providing a process for producing high-purity, high pressure carbon dioxide, which process and apparatus fractionate it for recovery in a purity higher than 99 percent from a mixture with another normally gaseous compound such as hydrogen sulfide. In some conventional fractionations, carbon dioxide may exist as a liquid in a fractionation tower, but it is always a minor constituent (2 percent), and always a nuisance, because it may freeze and block the equipment. In many other conventional cases, carbon dioxide exists in a fractionation column as a gas, generally to an extent 5 percent, but in such cases it cannot be separated from other components which are also gaseous under the fractionation tower operating conditions. Because of the well-known difficulties that are met when liquid carbon dioxide is in a fractionation tower, it has never been commercially fractionated as a major product, but is removed together with other acidic gases, prior to fractionation for other products, in order to avoid the above-mentioned difficulties. It should be noted that, regardless of pressure, carbon dioxide is a gas at a temperature of about 88° F. and above, and is a solid at temperatures of about $-70°$ F. and below. Between about $-70°$ and 88° F. it is either a liquid or a gas, depending on the pressure. The latter range is used in the present invention.

A major energy consumer in the process is the tower reboiler E7. However, the conditions have been so chosen that water which has been previously heated in cooling service in exchangers, not shown, can provide the reboiler E7 energy at no cost, and be cooled, with possible reduction in cost at the cooling water tower T10, if the water is recirculated.

The liquid bottoms product of the tower T10 is either high purity hydrogen sulfide, or a mixture of sulfur compounds. In either case, this bottoms product is a more concentrated feed for the production of sulfur or sulfuric acid than was the original feed stock, and in addition is at a higher pressure, so that it can be transported without additional compression. Prior to the present invention, the mixture of acidic gases from the feed point of this process in line L1 might be vented to atmosphere and become a costly disposal problem rather than an asset.

Further a large part of the refrigerating effect required to liquefy the sulfur compounds in the feed stream is recovered by later vaporization. The production of high-purity hydrogen sulfide from a feed mixture of only carbon dioxide and hydrogen sulfide is unexpectedly easy by means of the invented process due to the unusual vapor-liquid equilibrium of carbon-dioxide hydrogen-sulfide mixtures.

While in accordance with the patent statutes a preferred and alternative embodiment of this invention has been illustrated and described in detail, it is to be particularly understood that the invention is not limited thereto or thereby.

I claim:

1. A process for economically producing high-purity, high-pressure carbon dioxide from a concentrated low-pressure mixture of acid gases including a sulfur-containing gas and carbon dioxide as the gas in the mixture with the highest vapor pressure, said mixture containing less than 1 percent of nonacid gases, said process including the steps of:
   a. compressing said mixture of acid gases;
   b. cooling said mixture in a heat exchange relationship with liquid bottoms of said sulfur-containing gas;
   c. fractionating said mixture of liquefied acid gases into a high-purity carbon dioxide liquid overhead of about 99.95 percent and said liquid bottoms of said sulfur-containing gas; and
   d. vaporizing said carbon dioxide liquid overhead in heat exchange relationship with said mixture of acid gases during the cooling thereof.
   e. cooling said mixture downstream from the heat exchange in step (d) with a closed cycle refrigeration system and further cooling the overhead from the fractionating step (c) with said closed cycle refrigeration system; and
   f. cooling said mixture with the bottoms from said fractionating step (c) upstream of the heat exchange in step (d).

2. The process recited in claim 1 including the step of further cooling said mixture in a second heat exchange relationship with a refrigeration means.

3. The process recited in claim 1 and including the step of reducing the sulfur-containing gas content in said vaporized carbon dioxide overhead from about 0.05 to about 0.01 percent by passing said vaporized carbon dioxide overhead through an iron oxide system.

4. The process recited in claim 3 and including the step of further reducing the sulfur-containing gas content in said vaporized carbon dioxide overhead from about 0.01 to about 0.002 percent by passing said vaporized carbon dioxide overhead through a molecular sieve system.

5. The process recited in claim 1 wherein said mixture of acid gases is compressed to a pressure in the range of about 300 to 500 p.s.i.a. at a temperature of about 40° to 200° F.

6. The process recited in claim 1 wherein said mixture of acid gases is compressed to a pressure in the range of about 325 to 350 p.s.i.a. at a temperature of about 40° to 110° F.

7. The process recited in claim 1 and including the step of drying said mixture of compressed acid gases prior to cooling said mixture of acid gases to prevent the formation of hydrates in said mixture of acid gases.

8. The process recited in claim 1 wherein said mixture of compressed acid gases is cooled by said liquid bottoms of said sulfur-containing gas to a temperature of about 50° F. at a pressure of 315 to 340 p.s.i.a.

9. The process recited in claim 8 wherein said mixture of compressed acid gases is further cooled in heat exchange relationship with said carbon dioxide liquid overhead during vaporization of said carbon dioxide liquid overhead to a temperature of about 40° F. at a pressure of about 310 to 335 p.s.i.a.

10. The process recited in claim 9 wherein said mixture of compressed acid gases is further cooled in heat exchange relationship with said refrigerating means to a temperature of about 35° to 40° F. at a pressure of about 305 to 330 p.s.i.a.

11. The process recited in claim 1 wherein said mixture of compressed acid gases is cooled to a temperature of about 35° to 40° F. at a pressure of about 305 to 330 p.s.i.a.

12. The process recited in claim 1 wherein said sulfur gas containing liquid bottoms is heated and reintroduced to the fractionating of said mixture of acid gases.

13. The process recited in claim 1 wherein said carbon dioxide liquid overhead is refluxed to the refractionating of said mixture of acid gases.

* * * * *